(12) United States Patent
Crilly, Jr.

(10) Patent No.: US 7,177,369 B2
(45) Date of Patent: Feb. 13, 2007

(54) MULTIPATH COMMUNICATION METHODS AND APPARATUSES

(75) Inventor: William J. Crilly, Jr., Liberty Lake, WA (US)

(73) Assignee: Vivato, Inc., Portland, OR (US)

( * ) Notice: Subject to any disclaimer, the term of this patent is extended or adjusted under 35 U.S.C. 154(b) by 810 days.

(21) Appl. No.: 10/131,864

(22) Filed: Apr. 25, 2002

(65) Prior Publication Data

US 2002/0159537 A1    Oct. 31, 2002

Related U.S. Application Data

(60) Provisional application No. 60/287,163, filed on Apr. 27, 2001.

(51) Int. Cl.
H04K 1/02 (2006.01)
H04L 25/03 (2006.01)
H04L 25/49 (2006.01)

(52) U.S. Cl. .................... 375/296; 375/285

(58) Field of Classification Search .............. 375/267, 375/279, 147, 150, 220, 228, 229, 231, 346, 375/347, 296, 285; 370/203, 226, 229, 252
See application file for complete search history.

(56) References Cited

U.S. PATENT DOCUMENTS

| | | | | |
|---|---|---|---|---|
| 5,648,955 A * | 7/1997 | Jensen et al. | ............... | 370/252 |
| 5,848,054 A * | 12/1998 | Mosebrook et al. | ........ | 370/226 |
| 5,881,108 A * | 3/1999 | Herzberg et al. | ........... | 375/296 |
| 5,881,363 A * | 3/1999 | Ghosh et al. | ................ | 725/125 |
| 5,930,267 A * | 7/1999 | Daneshrad et al. | ......... | 370/509 |
| 6,023,242 A * | 2/2000 | Dixon | ........................ | 342/359 |
| 6,031,866 A * | 2/2000 | Oler et al. | .................... | 375/219 |
| 6,052,412 A * | 4/2000 | Ruether et al. | ............. | 375/231 |
| 6,252,914 B1 * | 6/2001 | Yamamoto | ................... | 375/296 |
| 6,314,135 B1 * | 11/2001 | Schneider et al. | .......... | 375/232 |
| 6,314,147 B1 * | 11/2001 | Liang et al. | ................ | 375/346 |
| 6,324,220 B1 * | 11/2001 | Sellars | ........................ | 375/296 |
| 6,377,819 B1 * | 4/2002 | Gesbert et al. | .......... | 455/562.1 |
| 6,445,750 B1 * | 9/2002 | Chen et al. | .................. | 375/300 |
| 6,567,040 B1 * | 5/2003 | Sevaston | ..................... | 342/354 |
| 6,611,511 B1 * | 8/2003 | Schulz | ........................ | 370/342 |
| 6,665,308 B1 * | 12/2003 | Rakib et al. | ................. | 370/441 |
| 6,674,808 B1 * | 1/2004 | Griph et al. | ................ | 375/285 |
| 6,741,643 B1 * | 5/2004 | McGibney | .................... | 375/229 |
| 6,763,062 B1 * | 7/2004 | Kohno et al. | ............... | 375/220 |
| 6,792,049 B1 * | 9/2004 | Bao et al. | .................... | 375/285 |
| 6,804,312 B1 * | 10/2004 | Win et al. | .................... | 375/347 |
| 6,868,377 B1 * | 3/2005 | Laroche | ....................... | 704/205 |
| 6,870,515 B2 * | 3/2005 | Kitchener et al. | .......... | 343/853 |
| 6,912,247 B2 * | 6/2005 | Miyashita et al. | .......... | 375/228 |

(Continued)

Primary Examiner—Jean B. Corrielus
(74) Attorney, Agent, or Firm—Brooks & Cameron, PLLC

(57) ABSTRACT

Methods, apparatuses and systems are provided for identifying at least one multipath transmission delay within a reverse path data signal, determining at least one forward path pre-equalization parameter based on the transmission delay, and modifying a forward path data signal based on the forward path pre-equalization parameter. A reverse link transmission is used to help characterize the multipath delays that may exist between communicating devices. The reverse path data signal can include a training sequence or other like known/substantially-known data that can be analyzed to detect transmission delays, especially delays that extend beyond established guard intervals. Such pre-equalization techniques can be advantageously combined, for example, with antenna arrangements that support transmission diversity, spatial division transmission, and/or other like techniques.

91 Claims, 5 Drawing Sheets

U.S. PATENT DOCUMENTS

| | | | |
|---|---|---|---|
| 2002/0009058 A1* | 1/2002 | Kelly et al. | 370/316 |
| 2002/0065047 A1* | 5/2002 | Moose | 455/63 |
| 2002/0085118 A1* | 7/2002 | Harris et al. | 348/473 |
| 2002/0089927 A1* | 7/2002 | Fischer et al. | 370/229 |
| 2002/0165626 A1* | 11/2002 | Hammons et al. | 700/53 |
| 2002/0191540 A1* | 12/2002 | Fujii et al. | 370/229 |
| 2003/0058929 A1* | 3/2003 | Cox et al. | 375/150 |
| 2004/0095907 A1* | 5/2004 | Agee et al. | 370/334 |
| 2004/0184521 A1* | 9/2004 | Chen et al. | 372/231 |
| 2005/0143132 A1* | 6/2005 | Proctor et al. | 455/561 |
| 2005/0207334 A1* | 9/2005 | Hadad | 370/203 |

\* cited by examiner

MULTIPATH COMMUNICATION METHODS AND APPARATUSES

RELATED APPLICATIONS

This application is related to and hereby claims priority to provisional Patent Application Ser. No. 60/287,163, filed Apr. 27, 2001, and titled "Improved Multipath Communication Methods And Arrangements", and which is included herein by reference.

TECHNICAL FIELD

This invention relates to data communications, and more particularly to wireless communication systems, apparatuses and related methods that support wireless communication in a multipath signal propagation environment.

BACKGROUND

Computers and other like devices can be interconnected in a variety of ways to allow data to be communicated between them. One of the most common ways to provide such data communication is through a wired network. Wired networks, such as, e.g., wide area networks (WANs) and local area networks (LANs) tend to have a high bandwidth and therefore can be configured to carry digital data at high data rates. One obvious drawback to wired networks is that a user's movement is constrained since the computer needs to be physically connected to the network. Thus, for example, a user of a portable computer will need to remain near to a wired network junction to stay connected to the wired network.

An alternative to wired networks is a wireless network that is configured to support similar data communications but in a more accommodating manner. Here, the user of a portable device will be free to move around a region that is supported by the wireless network. A well known example of a wireless network is a cellular telephone network. Indeed, in the past, cellular telephone modems have proven popular for use with portable laptop computers and other like devices, despite their relatively low bandwidth.

In the future it is expected that higher bandwidth wireless networks will become more popular, especially in creating metropolitan area networks (MANs) in which users, i.e., subscribers, have the ability to freely move their portable communicating devices around within a coverage area. However, as the subscribers move about freely there will not always be a clear or otherwise unobstructed communication path between a transmitting network resource and the receiving device. For example, one or more buildings, roadways, bridges, or other man-made objects may interfere with the transmission of signals in the wireless network. So too may non-manmade objects, such as, e.g., mountains, hills, valleys, trees, etc., reduce the effectiveness of the wireless network.

For these and other reasons, there is need for improved methods and apparatuses that can support wireless communications within such varying environments.

SUMMARY

In accordance with certain aspects of the present invention, improved packet switched wireless data communication systems, networks, apparatuses, and related methods are provided.

The above stated needs and/or others are satisfied, for example, by a method in accordance with certain exemplary implementations of the present invention that includes identifying at least one multipath transmission delay within a reverse path data signal, determining at least one forward path pre-equalization parameter based on the transmission delay, and modifying a forward path data signal based on the forward path pre-equalization parameter.

In certain further implementations, the method also includes receiving the reverse path data signal over at least one reverse transmission path and transmitting the modified forward path data signal over at least one forward transmission path. Here, it is preferred that the reverse transmission path be substantially reciprocal to the forward transmission path, for example, at a given moment in time between a base station device and a consumer premise equipment device.

The reverse link transmission is essentially used to help characterize the multipath delays that may exist between the communicating devices. As such, in certain implementations the reverse path data signal includes a training sequence or other like known/substantially-known data that can be analyzed to detect transmission delays, especially delays that extend beyond established guard intervals.

In accordance with certain other implementations, such pre-equalization techniques can be advantageously combined, for example, with antenna arrangements that support transmission diversity, spatial division transmission, and/or other like techniques.

DETAILED DESCRIPTION

Figure 1:
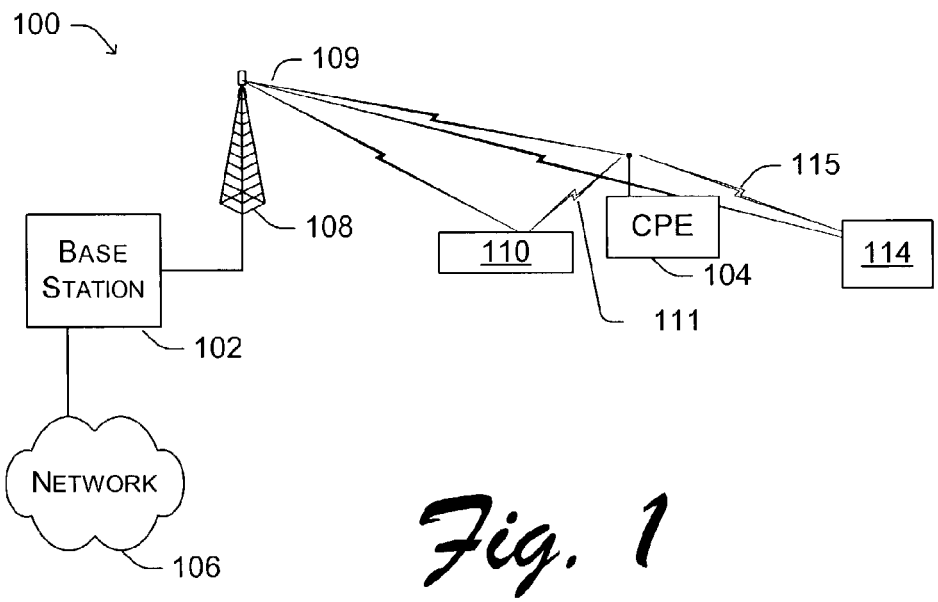
FIG. 1 is a block diagram depicting a communication system operating in a multipath environment, in accordance with certain exemplary implementations of the present invention.

Multipath Propagation Delays:

Wireless communication systems often operate under conditions that lead to multipath propagation of transmitted signals. Multipath propagation is primarily the result of reflections and diffraction from objects in the coverage area of the transmitting and receiving antennas.

High data rate communication systems may be subject to detrimental intersymbol interference caused by such multipath propagation or fading. As the symbol rate increases, for example, multipath fading from one symbol affects the next symbol, making it difficult, if not impossible, for the receiver to identify the desired (next) symbol and therefore determine its information content.

Multipath fading may be observed by examining the frequency domain characteristics of the communication channel. Here, for example, multipath fading will often cause the channel transfer function to have frequency-dependent responses that alter the amplitude and phase modulation content of a received signal. Symbols having high information content may therefore be difficult to separately identify. This can be true even for small amplitude and/or phase shifts that exist across the modulation bandwidth of the signal.

Traditional Modulation Techniques for Dealing with Multipath Propagation Delays:

Various modulation techniques have been used independently and/or in combination to ameliorate or avoid intersymbol interference.

By way of example, certain modulation techniques include equalization techniques at the receiving node. Such equalization techniques are usually designed to calculate a channel correction in the time and/or frequency domain, and in response significantly correct for any associated multipath fading. Correct symbol identification decisions may also be used to estimate the channel at subsequent times. One of the drawbacks to this solution is that it places an additional burden on the receiving node to provide such equalization capabilities.

Additionally such equalization techniques are usually limited by their capability to estimate and correct the channel. However, some difficulty may be caused by the changing nature of the multipath channel. For example, the computation of multipath propagation correction parameters that is made at a receiver may need to be repeated if/when the channel changes in someway. Examples of dynamic multipath propagation changes include the movement of the receiver/antenna, trees moving in the wind, nearby vehicular traffic, etc. Such changes may have time scales ranging from a few milliseconds to a few seconds, depending on environmental conditions. Unfortunately, implementing such complex equalization techniques in a receiver may not always be feasible.

Other modulation techniques that have been developed include the use of Orthogonal Frequency Division Multiplexing (OFDM) to significantly increase the symbol time. This prevents a delayed symbol from deleteriously effecting a subsequent symbol. Basically, OFDM operates by coding a series of bits into a set of modulated orthogonal sub-carriers, thus producing a symbol to be transmitted. The transmitted OFDM symbol typically includes a guard interval (GI) that contains a cyclic extension of the basic symbol. When a GI is employed, it is typically designed to be longer than the expected multipath propagation delay spread of the channel.

OFDM is usually generated using an inverse fast Fourier transform (IFFT) process. Consequently, OFDM is then received using a fast Fourier transform (FFT) process. Techniques that establish the correct timing of FFT blocks and channel correction techniques for the GI based on the multipath fading are well known. One common technique, for example, is to use a complex correction value for each OFDM sub-carrier. The magnitude of the complex correction value can be obtained from the inverse of the sub-carrier magnitude, and the phase can be determined from a linear regression of the phase of pilot sub-carriers and other signals in training symbols.

One of the drawbacks to the OFDM GI is that the system may still be susceptible to multipath delays that are beyond the GI.

In still other systems, spread spectrum techniques may be used to encode a bit into a long coded sequence having a narrow autocorrelation function. A spread spectrum receiver would then include, for example, a RAKE receiver with cross correlators, which are configured to identify and handle individual multipath signals arriving at the receiver. Such spread spectrum techniques, however, may not prove to be economically viable solutions in every situation.

Other modulation techniques that can reduce the affects of multipath delays on a communication system include ideas such as rapidly changing channels to produce an adequate signal at a different time. For example, see "Multicarrier Modulation For Data Transmission: An Idea Whose Time Has Come" by John A. C. Bingham, published in *IEEE Communications Magazine*, May 1990.

In general, the various techniques described above utilize time and/or frequency diversity to overcome potential multipath transmission problems. The corresponding modulation systems, therefore, tend to spread a given amount of information over a band of frequencies or in time to provide improved performance within the multipath environment.

Traditional Antenna Techniques for Dealing with Multipath Propagation Delays:

In addition to the above techniques, various antenna designs may be used to further ameliorate the effects of multipath propagation and fading. Certain systems, for example, employ what is commonly referred to as spatial division techniques. Here, transmitting antennas having narrow beam widths are employed to reduce multipath propagation caused by reflections from various objects by not illuminating those objects in the first place. Thus, usually only local diffraction and retro-reflection from objects more directly behind the receiving antenna, for example, remain to produce multipath fading.

Similarly, a receiving antenna with a narrow beam width may also help to reduce some remaining multipath fading. Here, however, one disadvantage is that the intended receiving node must determine or otherwise be specifically configured to receive signals from a direct path while avoiding certain multipath propagation signals.

Spatial division techniques may be performed with single or multielement transmitting and/or receiving antennas. Some multielement antennas, for example, are also referred to as phased array antennas.

Multielement transmitting antennas are advantageous for several reasons. For example, multielement transmitting antennas distribute required average signal power over a number of separate low power amplifiers, which tends to reduce the complexity of each of the associated power amplifiers.

Furthermore, multielement transmitting and receiving antennas often have the advantage of reducing or eliminating antenna pointing requirements. Phased arrays, for example, are capable of providing flexible antenna patterns and simultaneously transmitting and receiving in several directions using the same antenna aperture. Due to this flexibility and the other advantages, phased arrays are very helpful in the reception and amelioration of signals that are affected by multipath fading.

Antenna spatial diversity is yet another subset of antenna techniques used to reduce the effects of multipath fading. Here, for example, multiple transmitting antennas that are physically spaced apart, e.g., by more than a wavelength, have the ability to produce different amplitude and phase shifts over the frequency band that is used. Computations based on the received signals from the antennas may be used to establish one or more paths between the transmitting and receiving sites. In addition, the signal-to-noise ratio (SNR) may be improved by combining signal paths coherently, and/or errors reduced in multiple post-detection decoders. Coherent combining techniques basically overlap spatial division techniques, because coherent combining enhances antenna patterns in some directions and minimizes the pattern in other directions.

Indeed, antenna processing techniques may also be employed to actually take advantage of multipath propagation. By way of example, in an extension of the spatial diversity techniques, multiple transmitting antennas having physical spacing of more than a few wavelengths may be used to illuminate scattering areas with slightly different wave fronts. As such, the separate transmit signals diffract or reflect off the illuminated areas and are picked up by a receiver antenna array.

In effect, the scattering regions become somewhat poor, yet at times very large, pseudo-lenses that can be intentionally illuminated by the distant transmitting antennas. A large pseudo-lens has the ability to resolve closely spaced distant points, as determined by the Aires Disk of the effective pseudo-lens aperture. Receiver signal processing may then act to correct the phase and amplitude errors of such large pseudo-lenses.

Thus, in one example, a number of separate possible paths between the transmitter and receiver may be determined by the rank of a matrix establishing the paths between the transmitter and receiver antennas. This ranking may be determined by the richness of the scattering paths and the number of receiving and transmitting antennas. When the ranking is high, it is often possible to provide high spectral efficiency as measured in bits per second per Hz.

The antenna signal processing techniques described above are limited, however, by a fundamental capability of the average-power-limited transmitter to adequately transmit the signals to the receiver. Here, Shannon's Capacity Theorem determines the bit rate capacity of each of the effective multipath channels between the transmitter and receiver. For example, in a multipath channel with equal-amplitude direct and reflecting paths, an identical minimum SNR is required for each received path. Hence, adequate received signal power needs to be available to maintain the SNR above this minimum value.

The SNR may be improved by increasing the average transmitter power, by directing greater power at the receiver and at the scattering object, and/or by gathering more power at the receiver, e.g., by using a larger receiver antenna aperture. In the case of a larger receiver antenna aperture, a multielement large aperture receive antenna may be used in combination with signal processing to separately extract data from each multipath propagation. At the transmitting site, single element antennas or multielement transmit antennas with array signal processing may be used to direct power in specific directions.

Conclusion Regarding Such Traditional Techniques:

Although the various techniques described above greatly improve the capacity of a wireless system/network to carry information, there are remaining difficulties.

By way of example, channel equalization of high symbol rate systems typically requires many taps in a transversal filter, and/or requires long IFFT/FFTs to be calculated.

Another example relates to the use of a GI or the like. Low symbol rate systems, such as, e.g., OFDM symbols, can be very robust for a pre-determined multipath delay spread by providing an appropriate guard interval (e.g., a guard interval that is longer than the longest expected multipath delay spread). However, such potentially long GIs essentially set the time duration of the FFT processing step in OFDM. Thus, a long GI tends to reduce capacity. A long FFT processing tends to increase latency. Long FFTs also usually require data to be placed in large blocks, and/or zero-padded, which adds overhead.

Spread spectrum systems, such as those described above, tend to lose the orthogonality of sequences when multipath fading is present, thereby reducing the capacity of the system.

While transmit spatial division antenna processing is sometimes capable of eliminating highly-delayed multipath fading, it may not be capable of eliminating retro-reflected multipath fading.

Spatial receive diversity techniques usually increase the reliability, and potentially the capacity of the channel. However, spatial diversity techniques have the disadvantage that significant antenna signal processing is required at the receiver. Indeed, such receive antenna signal processing usually requires separate receive antennas and receivers for each path.

Consequently, none of the various techniques provide a simple and cost effective solution to multipath fading. For this reason, it may be advantageous to combine a plurality of these techniques and/or others within one system. For example, the combination of OFDM and other techniques has been shown, see, e.g., U.S. Pat. Nos. 5,282,222, and/or 5,029,184.

The Wi-LAN transmitter described by U.S. Pat. No. 5,282,222 uses a measurement of the differential channel amplitude and estimates the differential channel phase based on the assumption of a minimum phase multipath characteristic. A training signal and GI are not required. However, multiple point channel equalization is not possible within a single OFDM sub-channel. This limits the maximum delay spread to approximately the symbol duration.

The OFDM equalizer in the receiver taught by U.S. Pat. No. 5,029,184 requires two symbols to be transmitted per desired symbol.

Note that the above-described techniques/systems do not provide equalization for a large delay spread when the radio chipsets and associated physical layer standards do not include amelioration of these long delay spreads.

In accordance with certain aspects of the present invention, improved methods, apparatuses and systems are provided to overcome these and/or other shortcomings of conventional wireless systems/networks.

Introducing Novel Pre-Equalization Techniques:

As signal processing costs are reduced, techniques involving greater computation are usually preferred over those requiring more transmitter power. Furthermore, as part of a design process it is usually preferred that any required additional processing complexity be implemented at the node/location which is least subject to complexity restrictions, such as a base station or the like in a wireless communication system/network. With these and/or other design considerations in mind, in accordance with certain aspects of the present invention equalization techniques are provided for use at a transmitting node and configured to perform pre-equalization that substantially reduces unwanted effects associated with multipath fading, including retro-reflected propagation delays. Such pre-equalization techniques are discussed in greater detail in later sections.

As is well known, many materials are electromagnetically isotropic, which is a property resulting from symmetry in their associated permittivity and permeability tensors. The Lorentz Reciprocity Theorem applies to such materials. Refraction and dielectric reflection from materials therefore often show reciprocity, or equivalence of forward and reverse channel characteristics. Diffraction and reflection are inherently reciprocal due to the minimal media affecting the electromagnetic wave. Thus, reciprocity can be used to determine channel characteristics that are used while pre-equalizing a transmitted path. The use of a reciprocal channel is very useful, for example, when Time Division Duplex (TDD) channels are implemented.

In accordance with certain implementations of the present invention, a wireless system/network is provided which is capable of operating in a multipath environment. For example, improved methods and apparatuses are provided for use in the wireless system/network to significantly minimize the complexity of signal processing required at the receiving node. Here, the receiving node may include a single receive antenna or multiple receive antennas.

As described above, some conventional techniques use OFDM signal sequences to correct for multipath effects due to multipath delay spread shorter than the guard interval. A new wireless system/network is described herein, which uses a novel combination of new and known techniques to further improve multipath propagation delay handling and to also reduce the complexity of signal processing required at the receiver.

Although several OFDM-based system examples are provided herein, it should be recognized that the various methods and apparatuses are fully adaptable/applicable to other communication protocols, standards, schemes, and/or systems. Moreover, such pre-equalization and like methods and apparatuses may also be advantageously combined with other existing techniques to improve communication within a multipath environment.

With this in mind, in certain exemplary implementations a signal processing technique combines or otherwise includes transmitter antenna spatial division processing, antenna diversity processing, and/or receiver OFDM sub-carrier equalization, with OFDM pre-equalization. The exemplary OFDM pre-equalization technique basically acts within the frequency band of OFDM sub-carriers to pre-equalize the multipath channel to handle multipath delay spread greater than the delay protection provided by conventional OFDM signal processing techniques, such as, e.g., the OFDM GI. Thus, the receiver can still correct multipath effects that are less than the GI.

The pre-equalization techniques use training sequences, which are contained within a reverse link received OFDM burst, to specifically adjust associated transmission signals/parameters applied to subsequent OFDM transmissions back towards that particular node. In accordance with certain implementations, for example, the training sequences may or may not be part of the header and equalization sequences provided for in a conventional chipset or standard. Furthermore, in certain implementations substantially fewer OFDM symbols may be transmitted, than may be in more traditional systems.

An Exemplary Multipath Environment:

Reference is now made to FIG. 1, which is a block diagram depicting an exemplary communication system 100 operating in a multipath environment. Here, a base station device 102 is configured to exchange data with at least one customer premise equipment (CPE) device 104 through an antenna 108 and over a wireless communication link. Base station device 102 is further operatively configured to send and receive data via one or more networks 106. In this manner, data can be received through network 106 by base station 102, and then forwarded over a wireless communication link to CPE device 104 using antenna 108. Likewise, in reverse order, CPE device 104 can transmit data over a wireless communication link to base station device 102 through antenna 108, and base station 102 may then forward the received data to other device(s) via network 106.

As illustrated in this example, a transmission 109, which is generated by base station device 102, is emitted from antenna 108. Transmission 109 takes a direct path to CPE device 104. However, given the physical surroundings, transmission 109 radiates and is reflected or diffused, for example, by one or more objects 110 that are closer to antenna 109. This causes a multipath propagation signal 111 to be directed towards CPE device 104. Similarly, some of the electromagnetic energy in transmission 109 can be retro-reflected back towards CPE device 104, as multipath propagation signal 115, by one or more objects 114 located further away from antenna 109. Other types of multipath propagation signals may also be created by various other objects within the coverage field of transmission 109.

CPE device 104 is representative of any type of device that may be capable of sending and receiving data over a wireless communication link. By way of example, CPE device 104 may include a computer, a portable computer, a personal digital assistant (PDA), a mobile communication device, such as, e.g., a mobile telephone or other like handheld device.

Figure 2:
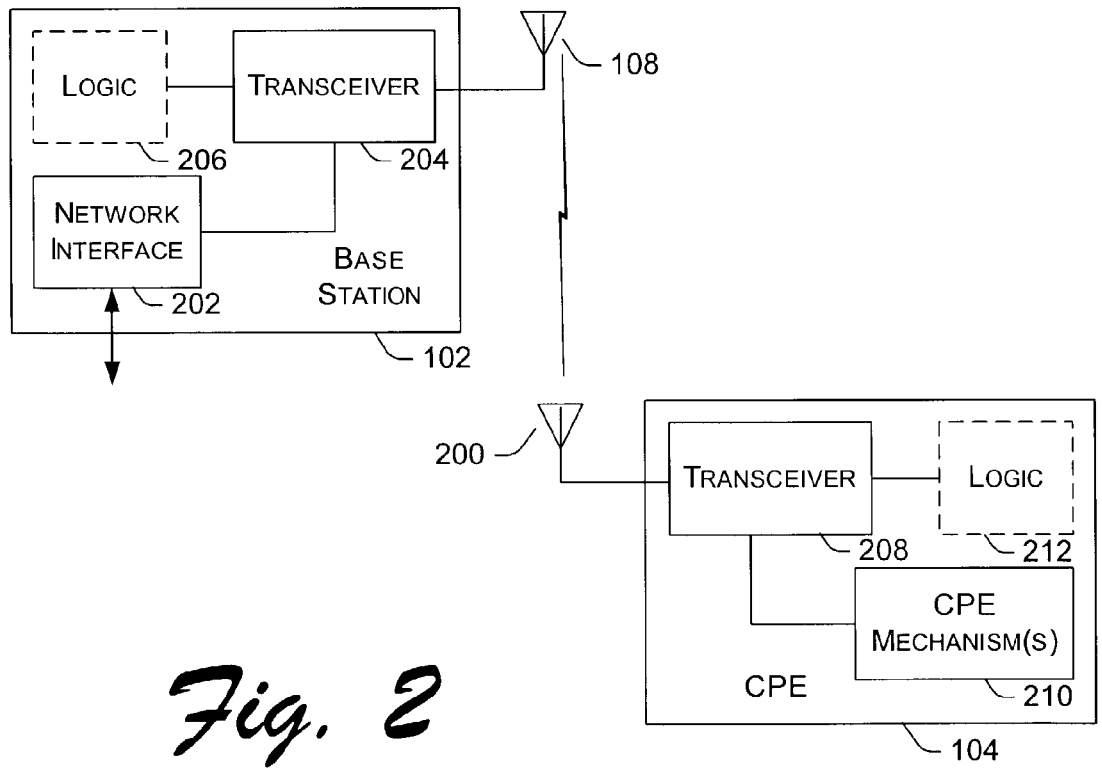
FIG. 2 is a block diagram depicting certain functional blocks within a base station device and a CPE device, for example, as shown in FIG. 1, in accordance with certain exemplary implementations of the present invention.

Exemplary Base Station and CPE Nodes:

FIG. 2 is a block diagram depicting functional units within base station device 102 and CPE device 104, in accordance with certain exemplary implementations of the present invention. Here, base station device 102 includes a network interface 202 that is configured to send and receive information in the form of data over one or more networks 106. Network interface 202 is operatively coupled to a transceiver 204. Transceiver 204 is also operatively coupled to logic 206 and antenna 108. Transceiver 204 is configured to send and receive information in the form of data to/from network interface 202 and/or logic 206. Transceiver 204 is further configured to send and receive information in the form of data to/from antenna 108. In this example, antenna 108 is representative of any number of transmitting and/or receiving elements provided in any suitable type of antenna configuration. For example, in certain implementations, antenna 108 includes a phased array antenna having a plurality of elements. Logic 206 is provided in this example to represent any applicable additional logic/circuitry that may be used to implement all or part of the methods and apparatuses of the present invention. In certain implementations, logic 206 may be integrated within transceiver 204. For this reason, logic 206 is depicted within a dashed line box.

CPE device 104 includes a corresponding transceiver 208, which is operatively coupled to an antenna 200, one or more CPE mechanisms 210 and logic 212. Here, as with antenna 108, antenna 200 is representative of any applicable type of antenna configuration. In accordance with certain implementations of the present invention, for example, antenna 200 includes an omnidirectional antenna. Although depicted outside of the representative CPE device box, it should be understood that antenna 200 may be internal and/or external of an actual CPE device.

Transceiver 208 is configured to receive data from and provide data to CPE mechanism(s) 210. CPE mechanism(s) 210 is representative of one or more mechanisms associated with the functionality of CPE device 104. Thus, for example, in certain implementations CPE device 104 includes a computer or like computing device. As such, CPE mechanism(s) 210 may take the form of a processor that is coupled to memory and operatively configured to perform functions in accord with one or more computer instructional programs, e.g., application programs. In still other implementations, CPE device 104 may include a mobile telephone, in which case, CPE mechanism(s) 210 may include a signal processor and other circuitry for converting digital audio data into an applicable analog audio signal and converting an analog audio signal into corresponding digital data.

Logic 212 is provided in this example to represent any applicable additional logic/circuitry that may be used to implement all or part of the methods and apparatuses of the present invention. In certain implementations, logic 212 may be incorporated in transceiver 208. For this reason, logic 212 is depicted within a dashed line box.

Figure 3:
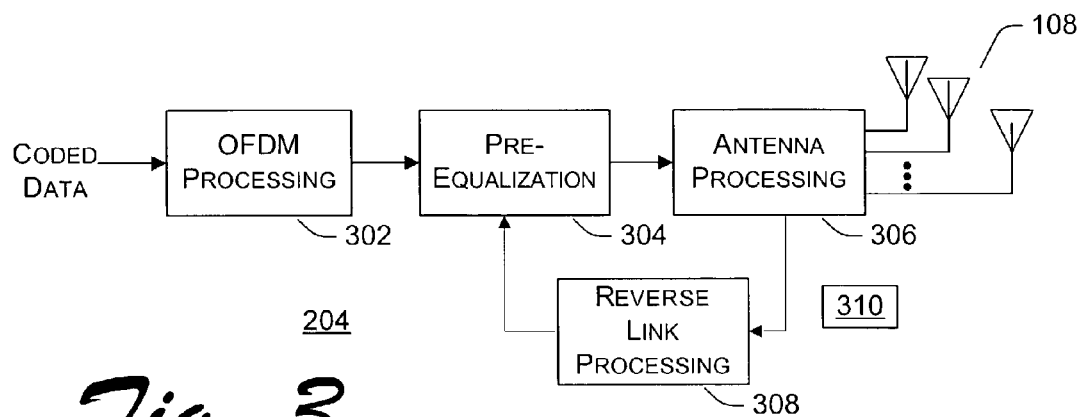
FIG. 3 is a block diagram depicting certain functions within a transceiver functional block, for example, as shown in FIG. 2, in accordance with certain exemplary implementations of the present invention.

Providing a Pre-Equalization Capability at an Exemplary Base Station Node:

Attention is now drawn to the block diagram in FIG. 3, which depicts exemplary functions provided within in transceiver 204, in accordance with certain implementations of the present invention.

FIG. 3 is a functional block diagram, wherein a set of coded data to be transmitted from base station device 102 to CPE device 104 is further prepared, pre-equalized and eventually transmitted. Here, for example, a set of coded data may comprise ninety-six bits of binary data, which is applied in pairs to (or otherwise processed by) OFDM processing block 302.

In this example, OFDM processing block 302 is configured to generate corresponding Quadrature Phase Shift Keying (QPSK) modulation values for each of forty-eight OFDM sub-carriers. These OFDM modulated sub-carriers may, for example, be output by an OFDM IFFT (not shown). The OFDM modulated sub-carriers are then provided to a pre-equalization block 304.

Pre-equalization block 304 is configured to modify one or more of the OFDM modulated sub-carriers based on information from a reverse link processing block 308. Reverse link processing block 308 is basically configured to identify multipath propagation delays and/or problems for packets transmitted from CPE device 104 to base station device 102. One exemplary way to recognize multipath delays is to have CPE device 104 transmit a known sequence of data/tones. The received signal can then be compared or contrasted with the known sequence and differences detected, the differences being at least partially associated with the multipath communication environment. The differences, or information derived from such differences can then be used within pre-equalization block 304 to modify, in some manner, as applicable, the OFDM modulated sub-carriers. The modified ODFM modulated sub-carriers are then provided to antenna processing block 306, wherein they are further processed and eventually transmitted using one or more antennas 108.

Those skilled in the art will recognize that reverse link processing block 308 and pre-equalization block 304 may be implemented in a variety of ways. In certain exemplary implementations, for example, reverse link processing block 308 may include a tapped transversal filter, or FFT/multipliers/IFFT filter of length on the order of the longest expected multipath delay. The complex coefficients of the tapped filter, or the complex multiplier values, may be derived from the complex cross-correlation of the known OFDM signal sequences and the sequences received from the reverse path signal 310.

Figure 4:
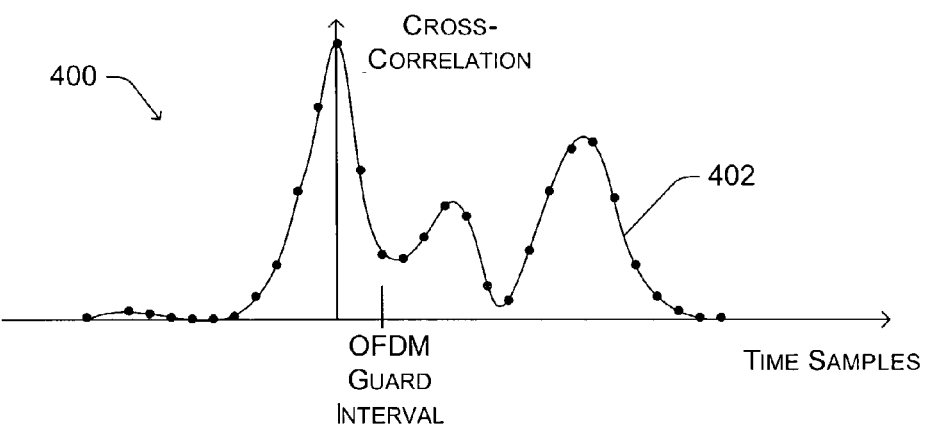
FIG. 4 is a graph depicting the magnitude of selected cross-correlation time samples illustrating, for example, that the multipath environment has caused certain delays with a transmitted signal, in accordance with certain exemplary implementations of the present invention.

The result of a sample cross-correlation output is shown in FIG. 4, which shows a graph 400 illustrating the magnitude of cross-correlation time samples plotted as line 402. Here, the period covered by an exemplary OFDM GI is also depicted. Line 402 illustrates that a multipath delay spread that is greater than the OFDM guard interval should be used.

Thus, pre-equalization block 304 may be configured, in this example, to invert the measured channel response so that the pre-equalization and the actual subsequently induced channel response errors substantially cancel out. As a result, transceiver 208 in the receiving CPE device will receive a signal that is essentially significantly free of troublesome multipath signals that are longer than the GI. Transceiver 208, therefore, will be able to reproduce and output the set of coded data, perhaps only with correctable errors. Such errors can be overcome/corrected is by further employing error control coding techniques, such as, e.g., CRC and other like techniques.

In certain systems, it may be likely that the reverse link bursts transmitted to base station device 102 fall below the noise level in the full bandwidth of the system. However, header signals, e.g., SIGNAL and pre-SIGNAL headers in IEEE 802.11a can be detected at lower levels. For example, the cross-correlation of the known header with signals received on two phased arrays would usually allow for improved sensitivity detection. This detection may be necessary for pre-equalization of the channel and for diversity summing to take place. An OFDM signal, for example IEEE 802.11a, may be detected at lower levels by using crosscorrelation with a known PILOT tone sequence. If fewer pilots are transmitted, then power may be concentrated in the pilots (provided, regulatory limitations are not exceeded). The offset of the cross correlation of known headers is to reduce the effective bandwidth, essentially establishing an effect similar to a RAKE receiver receiving a direct sequence waveform.

Continuing with this example, the subsequent multipath estimate can then be used to estimate antenna pointing and/or determine the near-optimal summation of signals received by the two phased array antennas. The base station device 102 produces a directed signal to CPE device 104 using substantially the same antenna and pre-equalized settings/parameters. If TDD is used, then the channel can be assumed to be reciprocal for durations (coherence time) of approximately 10 ms. The 10 ms duration can be determined in a fixed wireless system by passing vehicles, moving people, blowing trees, and/or other interruptions nearby or within the communication path/region.

An important aspect in certain implementations is that no attempt need be made to pre-equalize multipath delays less than the provided GI of the OFDM signal. Only those multipath signals that have an impact on the signal through OFDM inter symbol interference need be pre-equalized for at base station 102. Moreover, base station 102 can be further configured to post equalize the signals received from CPE device 104 based on the results of the reverse link processing.

The presence of fewer tones in the header and pilots potentially complicates the process of determining pre/post —equalization channel coefficients and/or other like parameters. This is due, for example, to the inadequate resolution in frequency, and thus inversely in time, which leads to aliasing as described in later sections.

The typical GI used in an OFDM system is usually only a small portion of the overall symbol time. For example, an OFDM symbol time of ten microseconds results from a sixty-four subcarrier OFDM system operating in a 6.4 MHz bandwidth. Thus, in this example, a GI may be chosen to be one microsecond to reduce overhead.

The delay spread is the time difference between the first and last arriving (significant) multipath propagated signal. In this example, the first and last arriving multipaths must arrive within one microsecond of each other to allow for successful conventional OFDM reception. As mentioned, however, some retro-reflected multipath propagated signals may produce delays that exceed this GI. For example, retro-reflected signals propagating from an object 114 (see FIG. 1) located at a distance of about one km behind the receiving CPE device 104 will result in an approximate 6.6 microsecond delay spread. Thus, the resulting composite signal cannot be handled by a conventional OFDM transceiver using a one microsecond GI.

When a phased array antenna 108 is used at the base station node to further ameliorate the effect of multipath, antenna element coefficients may be determined by evaluating, for example, the discrete Fourier transform (DFT) of the signals received on the elements of the phased array.

Figure 5:
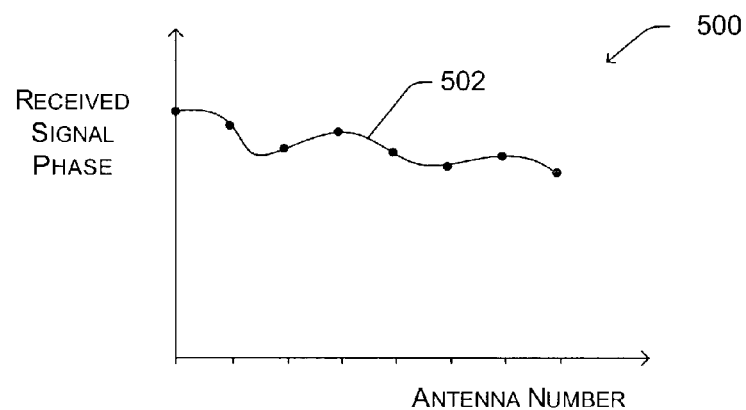
FIG. 5 is a graph depicting the phase of a transmitted signal as received by various antenna elements within an antenna array, in accordance with certain exemplary implementations of the present invention.

Referring next to graph 500 in FIG. 5, the effect of a direct and multipath signal can be seen by line 502, which plots the received signal phase for various numbered antenna elements.

Figure 6:
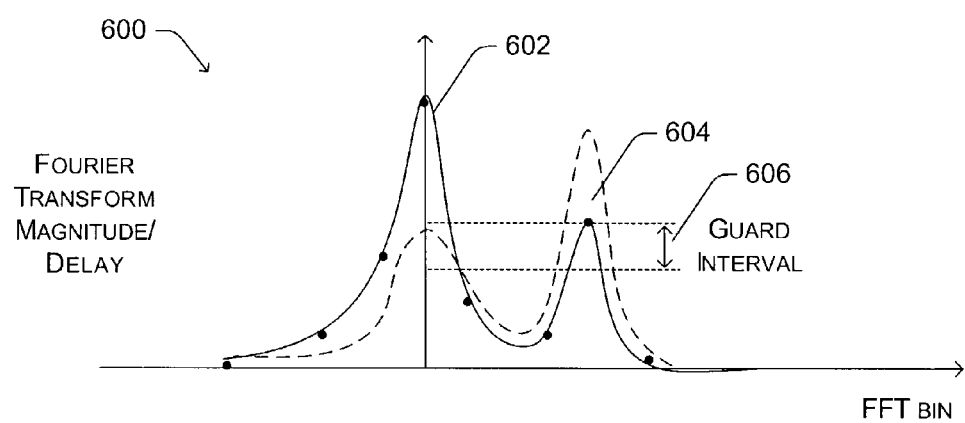
FIG. 6 is a graph depicting the results of certain calculations showing the Fourier transform magnitude/delay for various FFT bins, in accordance with certain exemplary implementations of the present invention.

After computation, for example, using an FFT to derive the angular distribution of the received signals, and cross-correlated the signals with known sequences, the delay and angle of arrival of the direct and multipath signal may be determined. Graph 600 in FIG. 6 shows the results of such calculations in the form of plotted lines 602 and 604 corresponding to the Fourier transform magnitude/delay for various FFT bins. Also shown is the corresponding delay period covered by a traditional GI 606.

In some situations the direct and multipath signals may be combined to actually improve the signal-to-noise ratio (SNR). However, in the exemplary situation shown in FIG. 6, the additional delay of a multipath signal 604 exceeds the GI used in the OFDM modulation. Knowing that the channel is essentially reciprocal allows a pre-equalization of the signals to be applied to the phased array during subsequent forward path transmissions from base station device 102 to CPE device 104. Alternatively, the pre-equalized signals may be applied at only one angle. In this case, pre-equalization may not be desired/necessary. In some cases two delays, in the same direction, may be determined in the cross-correlation/reverse link processing, as a result of retro-reflected multipath propagation. In which case, pre-equalization can then be employed to substantially correct the channel.

In those systems where only a few transmit antennas are used, transmit antenna diversity and like techniques may also be implemented in place of phased array transmission/processing.

For example, reverse link processing block 308 can be configured to determine or otherwise identify the best antenna to be used for reception based on measurements of the reverse link. Here, SNR, cross-correlation of the known sequences, or other measurements may be made. As multipath propagated signals longer in duration than the guard interval may be present, a determination can be made as to which antenna to select for the transmission of the pre-equalized signals. Thus, the combination of pre-equalization and diversity help to reduce the multipath signals at CPE device 104 to a level that allows the detection of user data, perhaps with correctable errors.

In accordance with certain further aspects of the present invention, transmit diversity may be implemented using simultaneous transmission of coded user data on diversity antennas. In systems where many transmit elements are used, transmit antenna diversity may be implemented in combination with phased array processing.

For example, base station device 102 may be configured to generate two simultaneous beams illuminating separate areas of a multipath environment. The transmit signals applied to the two antennas can be selectively adjusted in phase and amplitude to produce a signal at CPE device 104 that is substantially free of multipath propagated signals greater in delay than the GI. If a strong composite signal is received still containing a relatively large delay spread, then pre-equalization techniques may be applied by base station device 102, thereby driving the two beams to ameliorate the long delay spread of one or both of the multipaths. The system may further be configured to include antenna patterns other than a dual beam approach. For example, the transmitted pattern may be determined by an incident reverse path power pattern.

An example of known headers that may be used to support training sequences can be found in the IEEE 802.11a standard. IEEE 802.11a provides short and long sequences totaling a duration of about 8 μs. The 8 μs may be used to ascertain delay spread to approximately 8 μs delay. The known sequences have sufficient low frequency energy per burst (here, low being between about 100 kHz and 125 kHz, ⅛ μs resolution) to determine fine variations in the complex channel response.

As described, traditional OFDM systems rely on the GI to eliminate multipath effects during transmission of the tones in the OFDM signal. Longer delays require longer GIs. The techniques shown here use the long and short sequences to perform channel estimation, and decision feedback equalization, following the headers to equalize the channel for delays that are greater than $1/\Delta f$, where $\Delta f$ is the subcarrier (in OFDM) spacing.

Some Exemplary Training Sequences:

As described, CPE device 104 is configured to transmit a signal or signals back to base station device 102 over the reverse link transmission path. One or more of these transmissions may include training sequences that are designed to allow reverse link processing block 308 (see FIG. 3) to determine what if any changes need to be made in pre-equalizing the signals transmitted on the forward link transmission path from base station device 102 to CPE device 104.

The training sequences preferably include either substantially known or perfectly known training sequences. The training sequences in certain implementations, for example, may be included in the data or payload section of the OFDM symbols. In other implementations, known portions of a header or preamble may be used as the training sequence. The resulting training sequence signals may take a number of modulated forms, such as, e.g., spread spectrum signals, OFDMA signals, or other like signals.

Figure 7:
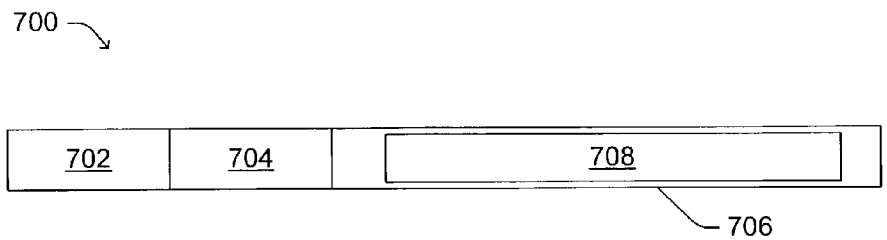
FIG. 7 is an illustrative diagram showing data that can be transmitted from the CPE device to the base station device to help characterize the multipath communication environment, in accordance with certain exemplary implementations of the present invention.

One exemplary implementation includes a training sequence within a physical layer PDU in an IEEE 802.11(a) system as illustrated in FIG. 7. Here, a frame 700 includes a preamble portion 702, a signal portion 704, and a payload portion 706. Payload portion 706 includes a training sequence 708 in the form of OFDM data/symbols. Preferably, training sequence 708 is adequately long enough to serve its purpose for the intended system and the OFDM data/symbols are not repeated.

Figure 8:
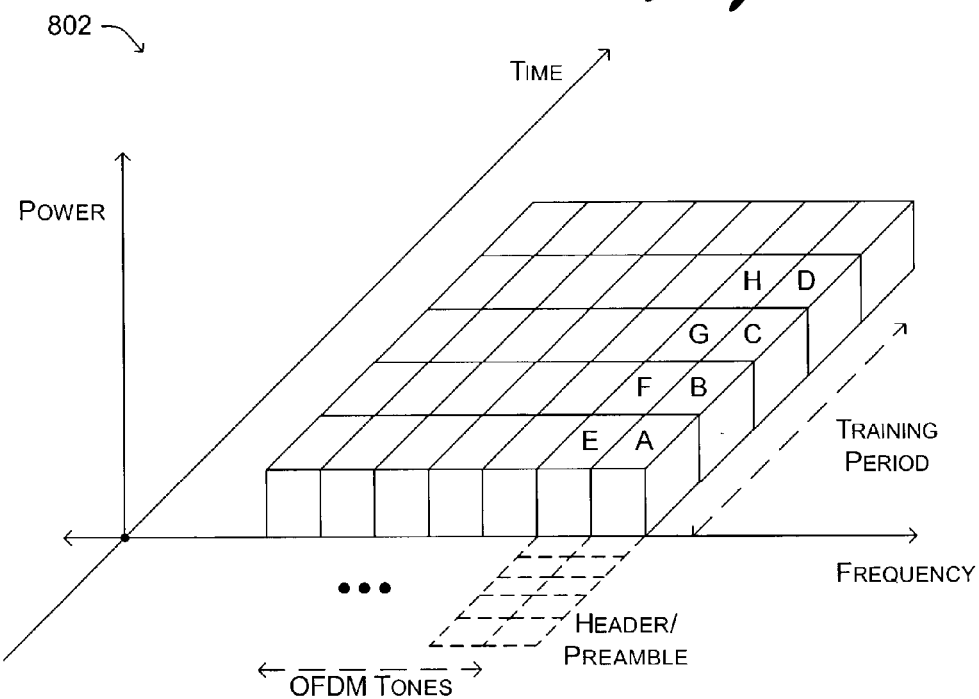
FIG. 8 is an illustrative diagram further showing data that can be transmitted from the CPE device to the base station device to help characterize the multipath communication environment, in accordance with certain exemplary implementations of the present invention.
Figure 8:
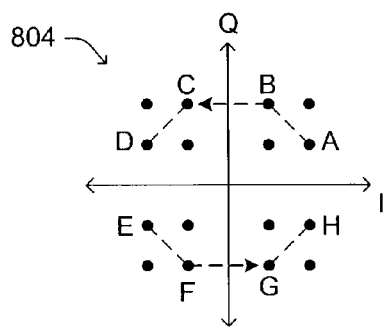

An illustrative waterfall representation is shown in FIG. 8. Here, power, time and frequency are plotted in a first graph 802 along with a corresponding constellation map (Q-I) in a second graph 804 illustrating the trajectory of the training sequence for an exemplary 16 QAM system. Here, the training sequence includes unique symbols identified by blocks 806 lettered A, B, C, D, E, F, G, and H, for example.

Exemplary Techniques for Dealing with Aliasing:

As described earlier, aliasing may occur, for example, when too few is symbols are transmitted. Aliasing may be dealt with by estimating on which aliased signal set the delay that needs to be pre/post-equalized actually exists, and making corrections accordingly. Thus, for example, if several potential aliased delays are found and in amongst them lies the actual delay to be pre/post-equalized against, then an iterative procedure can be followed wherein guesses are made, parameters set, and signals pre-equalized and transmitted. When the correct (actual) signal set is found and attempted to be equalized, then CPE device 104 will successfully receive the transmission and reply accordingly. If after transmitting a pre-equalized signal no reply (e.g., an acknowledgement) is received then it can be assumed that the signal set that was selected is only an aliased signal set. Subsequent transmission attempts with other selected signal sets (or regions) being pre-equalized can then be made. Preferably error correction techniques will also be employed to help CPE device 104 to process the transmitted signals.

Exemplary Low Bandwidth Reverse Link:

In accordance with certain further aspects of the present invention, it was recognized that in certain implementations it may be possible to use an IEEE 802.11a transmission on the reverse link to base station device 102 at a bit rate much less than the minimum 6 Mbps in the current standard. This may prove useful, for example, when CPE device 104 operates a much lower power levels than base station device 102 (which may operate at 1 watt, for example). Here, a slower speed reverse link may actually work better anyway due to shadow fading or otherwise poor link budget.

Thus, CPE device 104 can be configured to selectively make changes to the transmission process by backing out the effects of an interleaver, a FEC convolutional coder, and/or scrambler that may be included, for example, within transceiver 208. Furthermore, the same or other logic within CPE device 104 may be configured to force a constant phase shift, e.g., QPSK symbol over a long number of OFDM symbols, e.g., 16. Within transceiver 204 of base station device 102, the GI can then be removed and a long FFT performed on the compressed time interval due to GI removal. The long FFT length my be, e.g., 16*64 point=1024 point, wherein the bandwidth is $\frac{1}{16}$ of the 64 point FFT, resulting in an SNR improvement of about 16, i.e., 10 log 16=12.04 dB.

The systems above may be used with any OFDM modulated CPE devices. For example, by allowing for a slow phase rotation during the 16 symbol interval, OFDMA may be implemented. This would allow for more than one reverse link to be present at a time, thereby improving the reverse link capacity. If QAM modulation is used, for example, as opposed to QPSK, then slower phase rotation may be used. This would allow more of the 16 bins per 64 bins to be used. The data is provided in the tones in the usual way, but with a different phase, amplitude (QAM) per tone (of the 64 tones). This coding can be performed, for example, by applicable computer instructions within the logic of CPE device 104. This allows for the applicable power control, QAM modulation mapping and virtually all other "normal" operations to appear in the resulting modulation. This provides the ability to deploy IEEE 802.11a, for example, client devices and subsequently provide infrastructure that is capable of receiving the weak reverse link signals from such client devices.

Exemplary Frequency Domain Pre-Equalization Techniques:

In accordance with certain further implementations of the present invention, the pre-equalization techniques described herein may, for example, take advantage of frequency domain equalization techniques such as those described by Van Acker, et al., in an article titled "Per Tone Equalization For DMT-Based Systems", as published in *IEEE Transactions On Communications*, Vol. 49, No. 1, January 2001, and which is incorporated herein by reference. Van Acker et al., teach that a receiver can benefit from certain frequency domain equalization techniques.

Figure 9:
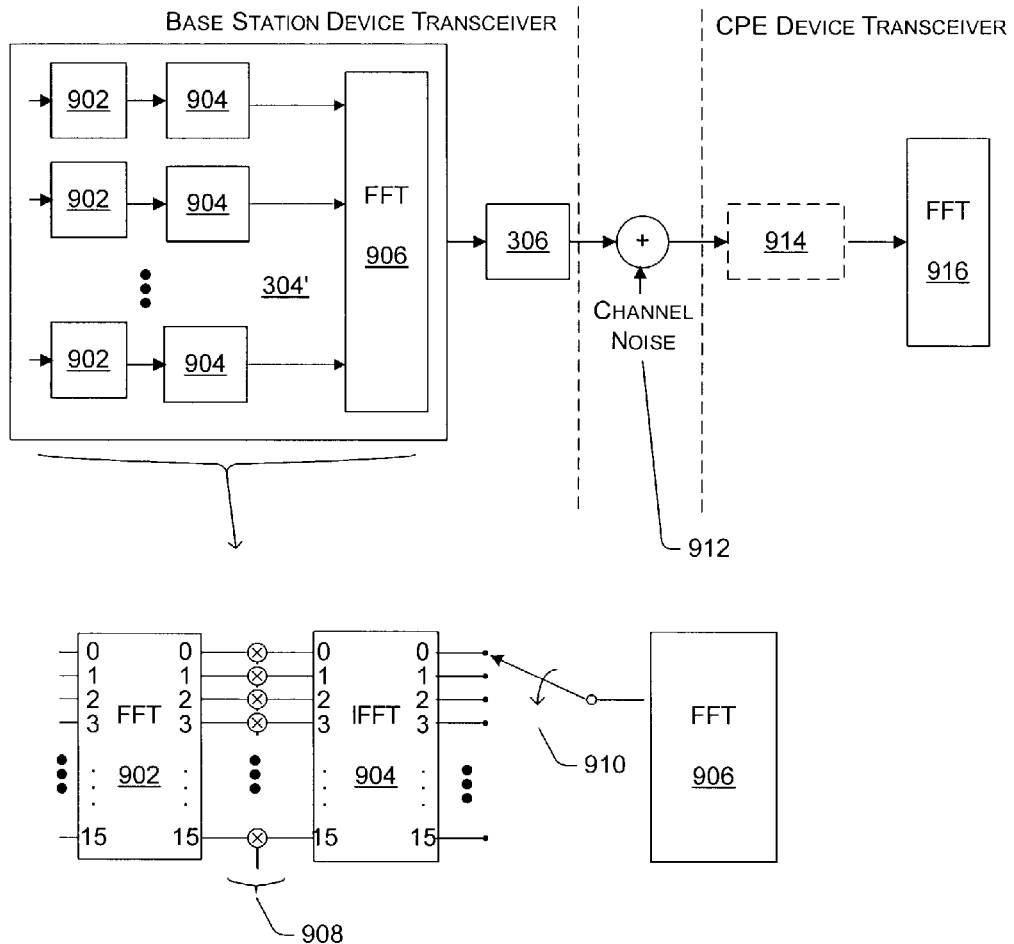
FIG. 9 is a block diagram depicting a frequency domain based pre-equalizer process suitable for use in a pre-equalization function, for example, as in FIG. 3, in accordance with certain exemplary implementations of the present invention.

Here, the Van Acker et al. equalization techniques are adapted for use in pre-equalizing signals in the transmitting portion of a base station or like device/node. An example of a frequency domain based pre-equalizer process 900 suitable for use in pre-equalization process 304 (see FIG. 3) is shown in the block diagram of FIG. 9.

In this example, frequency domain based pre-equalizer process 900 is shown to include, within the base station device transceiver, a pre-equalization processing block 304' having its output coupled to an antenna processing block 306, similar to that shown in FIG. 3. Here, however, pre-equalization processing block 304' includes several FFTs and IFFTs that are arranged to allow equalization parameters to be operatively applied to signals transformed from the time domain to a corresponding frequency domain. More particularly, several FFTs 902 are provided to receive signals that are to be transmitted. FFTs 902 convert these time domain signals, each of which is associated with a particular OFDM tone, into corresponding frequency domain signals. The outputs from FFTs 902 are provided to a scaling process 908 (or other like process) along with the desired/calculated channel coefficients or like parameters from a reverse link processing block 308 (not shown). Scaling process 908 modifies each tone as needed in accordance with the measured/estimated channel characteristics.

The scaled signals output by scaling process 908 are still frequency domain signals. To convert the scaled signals back in to a corresponding time domain, the scaled signals are then input to IFFTs 904. IFFTs 904 convert the scaled signals into corresponding time domain scaled signals. These time domain scaled signals are then selectively input to a longer (e.g., 64 input/output) FFT 906 that is used to complete the sub-band frequency domain equalization. In this illustrative diagram, each input to FFT 906 is switched such that it selects one of the time domain scaled signals output by an IFFT 904. The 64 selected scaled tone signals output by IFFT 904 are then provided to antenna processing block 306 for further processing and eventual transmission.

During transmission, the multipath environment alters the transmitted signals as represented by a summation process 912 that includes channel noise, for example, within the transmitted signals. The environmentally modified signals are received by the transceiver in the CPE device, wherein the signals may be stored in a memory device 914 and then provided to an FFT 916. Here, FFT 916 would be a longer (e.g., 64 input/output) FFT configured to process/convert the received signals. For example, FFT 916 can provide a one point FIR correction for each received tone signal.

In this implementation, the frequency domain processing provided above essentially acts a sub-band equalizer in the transmitting node (here, the base station device). The GI and other one point FIR correction is then provided in the receiver (here, the CPE device). Another aspect of this type of system is that power may be set to be equal in each of the sub-bands, allowing regulatory rules, such as FCC rules, to be satisfied. In this manner, the power may be substantially flattened over the spectrum.

Using Reduced Spectral Power Density Transmissions:

The power in each sub-carrier in the above example may be held substantially constant. A modification to the system involves the determination of a worst case path loss over the OFDM tones, for example, through the use of reciprocal measurements. Then the highest allowed power spectral density for that particular sub-carrier is used, while the power spectral density for other tones is reduced to allow the other tones to sustain the same level of QAM, QPSK, BPSK, etc. By reducing the power of the other tones, an improvement may be had with respect to the capacity of the system as a result of lower interference being generated. Thus, for example, doing so could allow the power amplifier to carry additional channels for the same PEP level.

The requisite power spectral density needed to establish a level of QAM can be determined, for example, by path loss estimation and the knowledge of the reverse link power level transmitted on the reverse link. Thus, logic operating on the CPE device may assist in the determination.

One exemplary method involves establishing a reverse link, having the CPE device provide information to the base station device regarding the power levels being used on the reverse link. Next, reciprocal path loss measurements are made by the base station device and a link budget for a particular QAM level is determined. Then variations in channel path loss can be used to set/reset minimum/maximum power levels for a particular QAM level, e.g., 16 QAM.

Sub-carrier/channel equalization is then provided by the base station device and the signals are transmitted to the CPE device. The CPE device then performs single point FIR equalization to decode the QAM (e.g., 16 QAM) tones. Then a decoder process corrects the errors caused, for example, by the tones that are below the QAM threshold.

Further Extensions of the Above Methods and Apparatuses:

As described and shown, cross-correlation processing, FFT processing and filtering may be implemented in a variety of ways. For example, it is possible to combine OFDM FFT processing and pre-equalization filtering. Cross-correlation may be best performed in the frequency domain using the previously calculated DFTs of the known OFDM signal sequences. The resulting calculations reduce to the calculation of a single FFT and a set of multiplications. Many other signal processing techniques may also be used.

Other implementations of this invention may be derived from the disclosed contents herein. By way of example, a practitioner may implement a high data rate communication system using separately calculated multipaths, with all of the paths transmitting on the same frequency. Another implementation may use receiver OFDM channel equalization for delays greater than the guard interval, thus improving performance.

In still other implementations, a reverse channel quality indicator, and/or the measured forward channel impulse response, may be transmitted on the reverse path when channel reciprocity is not available. Such a system may be useful when Frequency Division Duplex or Half Frequency Division Duplex is used.

In Frequency Division Duplex systems, short training signals may be periodically transmitted using Time Division Duplex on each of the frequencies used for Frequency Division Duplex. Multiple RF signals, operating on the same and different frequencies, may also be simultaneously transmitted and received. Furthermore, the operation of the described wireless system on the forward path may be similarly implemented in a wireless system on the reverse path.

An Example of Channel Measurement and Correction:

Certain exemplary 64-point FFT OFDM systems have a first tone measured on the reverse link to have a normalized amplitude slope from about 0.4 to about 0.25 and a phase shift from about 10 to about 100 degrees. The measurement can be performed using a 256-point FFT, for example. As such, eight samples are available to determine channel characteristics. Pre-equalization, for example, can then be applied on the forward link in the frequency domain using a 2.5 to 4 normalized amplitude and −10 to −100 degree slope across the eight frequency domain samples. A second OFDM tone can be calculated in a similar way.

Conclusion

Although some preferred implementations of the various methods and arrangements of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A method comprising:
   identifying at least one multipath transmission delay within a reverse path data signal received from a receiving device;
   determining at least one forward path pre-equalization parameter based on said at least one transmission delay; and
   modifying a forward path data signal that is to be transmitted to the receiving device based on said at least one forward path pre-equalization parameter, where said modifying includes selectively setting different transmission power levels for at least two Orthogonal Frequency Division Multiplexing (OFDM) tones in said forward path data signal.

2. The method as recited in claim 1, further comprising:
receiving said reverse path data signal over at least one reverse transmission path.

3. The method as recited in claim 2, further comprising:
transmitting said modified forward path data signal over at least one forward transmission path.

4. The method as recited in claim 1, wherein said reverse path data signal includes at least one type of data selected from a group of different types of data comprising Orthogonal Frequency Division Multiplexing (OFDM) data and Quadrature Phase Shift Keying (QPSK) data.

5. The method as recited in claim 1, wherein said modified forward path data signal includes at least one type of data selected from a group of different types of data comprising Orthogonal Frequency Division Multiplexing (OFDM) data and Quadrature Phase Shift Keying (QPSK) data.

6. The method as recited in claim 5, wherein said modified forward path data signal includes sub-carrier pre-equalized OFDM data.

7. The method as recited in claim 6, further comprising:
generating corresponding Quadrature Phase Shift Keying (QPSK) modulation values based on said sub-carrier pre-equalized OFDM data.

8. The method as recited in claim 4, wherein identifying said at least one multipath transmission delay includes:
identifying at least one multipath transmission delay spread that is greater than a guard interval.

9. The method as recited in claim 1, wherein said reverse path data signal includes identifiable training data.

10. The method as recited in claim 9, further comprising:
comparing said identifiable training data to a local version of said training data to identify said at least one multipath transmission delay within said reverse path data signal.

11. The method as recited in claim 3, wherein modifying said forward path data signal based on at least one forward path pre-equalization parameter further includes:
selectively inverting arid applying a measured channel response to said forward path data signal to significantly reduce subsequent induced deleterious channel response changes to said modified forward path data signal during transmission over said at least one forward transmission path.

12. The method as recited in claim 3, wherein said at least one reverse transmission path is substantially reciprocal to said at least one forward transmission path.

13. The method as recited in claim 1, wherein identifying said at least one multipath transmission delay, determining said at least one forward path pre-equalization parameter, and modifying said forward path data signal are performed by a transmitting device.

14. The method as recited in claim 13, wherein said transmitting device includes a base station device that is operatively configured for use in a wireless communication system.

15. The method as recited in claim 13, further comprising:
using at least one transmitting device receive antenna operatively coupled to said transmitting device to receive said reverse path data signal over at least one reverse transmission path from the receiving device.

16. The method as recited in claim 15, wherein said receiving device includes a customer premise equipment (CPE) device that is operatively configured for use in a wireless communication system.

17. The method as recited in claim 16, wherein said CPE device includes at least one device selected from a group of devices comprising a computer, a portable computer, a personal digital assistant (PDA), and a mobile communication device.

18. The method as recited in claim 15, wherein said at least one transmitting device receive antenna includes at least one type of antenna selected from a group of suitable types of antennas comprising at least one omnidirectional type of antenna, at least one beam type of antenna, at least one phased array type of antenna, and at least one adaptive antenna.

19. The method as recited in claim 15, wherein said transmitting device is operatively coupled to a plurality of first device receive antennas.

20. The method as recited in claim 13, further comprising;
receiving said reverse path data signal over at least one reverse transmission path; and
causing said transmitting device to post equalize at least a portion of said received reverse path signal.

21. The method as recited in claim 15, wherein determining said at least one forward path pre-equalization parameter based on said at least one transmission delay further includes:
determining at least one angle of arrival of said reverse path data signal with respect to said at least one transmitting device receive antenna.

22. The method as recited in claim 15, further comprising:
using at least one receiving device transmit antenna operatively coupled to said receiving device and configured to transmit said reverse path data signal over said at least one reverse transmission path to said transmitting device.

23. The method as recited in claim 22, wherein a plurality of receiving device transmit antennas are operatively coupled to said receiving device and configured to transmit said reverse path data signal over said at least one reverse transmission path to said transmitting device.

24. The method as recited in claim 22, further comprising:
causing said receiving device to transmit at least two reverse path data signals over said at least one reverse transmission path to said transmitting device.

25. The method as recited in claim 24, wherein said at least two reverse path data signals include Orthogonal Frequency-Division Multiple Access (OFDMA) data.

26. The method as recited in claim 22, further comprising:
causing said receiving device to transmit said reverse path data signal over said at least one reverse transmission path to said transmitting device at a bit rate less than about 6 Mbps.

27. The method as recited in claim 22, further comprising:
causing said receiving device to transmit corresponding receiving device transmission power level information to said transmitting device; and
causing said transmitting device to adjust at least one transmission power level associated with said forward path data signal based on said receiving device transmission power level information.

28. The method as recited in claim 13, further comprising:
using at least one transmitting device transmit antenna operatively coupled to said transmitting device to transmit said modified forward path data signal over at least one forward transmission path to the receiving device.

29. The method as recited in claim 28, wherein said at least one transmitting device transmit antenna is operatively configured to provide transmission diversity when transmitting said modified forward path data signal.

30. The method as recited in claim 28, wherein said at least one transmitting device transmit antenna is operatively configured to provide spatial division transmission utilizing a spatial division technique when transmitting said modified forward path data signal as a narrow signal to reduce multipath propagation.

31. The method as recited in claim 28, wherein said at least one transmitting device transmit antenna includes at least one type of antenna selected from a group of suitable types of antennas comprising at least one omnidirectional type of antenna, at least one beam type of antenna, at least one phased array type of antenna, and at least one adaptive antenna.

32. The method as recited in claim 28, further comprising:
setting at least one antenna pointing parameter associated with said at least one transmitting device transmit antenna based on said at least one forward path pre-equalization parameter.

33. The method as recited in claim 28, further comprising:
setting at least one phased array antenna transmission directing parameter associated with said at least one transmitting device transmit antenna based on said at least one forward path pre-equalization parameter.

34. The method as recited in claim 28, further comprising;
selectively transmitting said modified forward path data signal at one angle with respect to said transmitting device transmit antenna.

35. The method as recited in claim 28, further comprising:
selecting said at least one transmitting device transmit antenna from a plurality of transmitting device transmit antennas that are each operatively coupled to said transmitting device.

36. The method as recited in claim 35, further comprising:
selectively transmitting a plurality of beams using two or more transmitting device transmit antennas.

37. The method as recited in claim 36, wherein each of said transmitted plurality of beams is selectively adjusted in phase and amplitude to reduce multipath affects when received by said receiving device.

38. The method as recited in claim 28, further comprising:
using at least one receiving device receive antenna operatively coupled to said receiving device and configured to receive said modified forward path data signal over said at least one forward transmission path from said transmitting device.

39. The method as recited in claim 38, wherein a plurality of receiving device receive antennas are operatively coupled to said receiving device and configured to receive said modified forward path data signal over said at least one forward transmission path from said transmitting device.

40. The method as recited in claim 1, wherein determining said at least one forward path pre-equalization parameter based on said at least one transmission delay further includes:
iteratively selectively identifying different forward path pre-equalization parameters over time to operatively identify and subsequently ignore aliased multipath delays within said reverse path data signal.

41. The method as recited in claim 1, wherein determining said at least one forward path pre-equalization parameter based on said at least one transmission delay further includes:
sub-band equalizing said forward path data signal using corresponding frequency domain reverse path data.

42. A system comprising:
a first device operatively configured to connect to at least a second device over a wireless communication path, said first device having logic that is configured to detect a multipath transmission delay in at least one reverse path data signal transmitted by said second device, determine at least one forward path pre-equalization parameter based on said detected multipath transmission delay, and pre-equalize a forward path data signal that is to be transmitted to said second device based on said at least one forward path pre-equalization parameter; said first device further comprising:
at least one first device antenna; and
at least one transceiver operatively coupled to said at least one first device antenna and said logic, said at least one transceiver being configured to receive said reverse path data signal over at least one reverse transmission path using said at least one first device antenna and provide said reverse path data signal to said logic, and transmit said forward path data signal from said logic over at least one forward transmission path;
wherein said logic is further configured to cause said transceiver to selectively establish different transmission power levels for at least two Orthogonal Frequency Division Multiplexing (OFDM) tones in said forward path data signal based on said at least one forward path pre-equalization parameter.

43. The system as recited in claim 42, wherein said reverse path data signal includes at least one type of data selected from a group of different types of data comprising Orthogonal Frequency Division Multiplexing (OFDM) data and Quadrature Phase Shift Keying (QPSK) data.

44. The system as recited in claim 42, wherein said forward path data signal includes at least one type of data selected from a group of different types of data comprising Orthogonal Frequency Division Multiplexing (OFDM) data and Quadrature Phase Shift Keying (QPSK) data.

45. The system as recited in claim 44, wherein said forward path data signal includes sub-carrier pre-equalized OFDM data.

46. The system as recited in claim 45, wherein said logic is further configured to produce corresponding Quadrature Phase Shift Keying (QPSK) modulation values based on said sub-carrier pre-equalized OFDM data.

47. The system as recited in claim 43, wherein said logic detects said multipath transmission delay by identifying at least one multipath transmission delay spread that is greater than a guard interval.

48. The system as recited in claim 42, wherein said reverse path data signal includes identifiable training data.

49. The system as recited in claim 48, wherein said logic is further configured to compare said identifiable training data to a non-multipath delayed version of said training data to detect said multipath transmission delay.

50. The system as recited in claim 43, wherein said logic is configured to selectively invert and apply a measured channel response to said forward path data signal to significantly reduce subsequent induced deleterious channel response changes to said forward path data signal during transmission over said at least one forward transmission path.

51. The system as recited in claim 43, wherein said at least one reverse transmission path is substantially reciprocal to said at least one forward transmission path.

52. The system as recited in claim 42, wherein said first device includes a base station device that is operatively configured for use in a wireless communication system.

53. The system as recited in claim 43, wherein said second device is a customer premise equipment (CPE) device that is operatively configured for use in a wireless communication system.

54. The system as recited in claim 53, wherein said CPE device includes at least one device selected from a group of devices comprising a computer, a portable computer, a personal digital assistant (PDA), and a mobile communication device.

55. The system as recited in claim 43, wherein said first device is operatively coupled to a plurality of first device receive antennas.

56. The system as recited in claim 43, wherein said logic is configured to post-equalize at least a portion of said received reverse path signal.

57. The system as recited in claim 43, wherein said logic is further configured to determine at least one angle of arrival of said reverse path data signal with respect to said at least one first device antenna.

58. The system as recited in claim 53, wherein said second device includes at least one second device antenna that is operatively configured to transmit said reverse path data signal over said at least one reverse transmission path to said first device and receive said transmitted forward path data signal from said first device over said at least one forward transmission path.

59. The system as recited in claim 58, wherein said second device includes a plurality of second device antennas that are operatively configured to transmit said reverse path data signal over said at least one reverse transmission path to said first device.

60. The system as recited in claim 58, wherein said second device is configured to transmit at least two reverse path data signals over said at least one reverse transmission path to said first device.

61. The system as recited in claim 60, wherein said at least two reverse path data signals include Orthogonal Frequency-Division Multiple Access (OFDMA) data.

62. The system as recited in claim 58, wherein said second device is configured to transmit said reverse path data signal over said at least one reverse transmission path to said first device at a bit rate less than about 6 Mbps.

63. The system as recited in claim 58, wherein said second device is configured to transmit corresponding second device transmission power level information to said first device, and said first device is further configured to adjust at least one transmission power level associated with said forward path data signal based on said second device transmission power level information.

64. The system as recited in claim 43, wherein said at least one first device antenna is operatively configured to provide transmission diversity when transmitting said forward path data signal.

65. The system as recited in claim 43, wherein said at least one first device antenna is operatively configured to provide spatial division transmission utilizing a spatial division technique when transmitting said forward path data signal as a narrow signal to reduce multipath propagation.

66. The system as recited in claim 43, wherein said at least one first device antenna includes at least one first device transmit antenna and at least one first device receive antenna.

67. The system as recited in claim 66, wherein said at least one first device transmit antenna includes at least one type of antenna selected from a group of suitable types of antennas comprising at least one omnidirectional type of antenna, at least one beam type of antenna, at least one phased array type of antenna, and at least one adaptive antenna.

68. The system as recited in claim 66, wherein said at least one first device receive antenna includes at least one type of antenna selected from a group of suitable types of antennas comprising at least one omnidirectional type of antenna, at least one beam type of antenna, at least one phased array type of antenna, and at least one adaptive antenna.

69. The system as recited in claim 66, wherein said logic is further configured to establish at least one antenna pointing parameter associated with said at least one first device transmit antenna based on said at least one forward path pre-equalization parameter.

70. The system as recited in claim 66, wherein said logic is further configured to establish at least one phased array antenna transmission directing parameter associated with said at least one first device transmit antenna based on said at least one forward path pre-equalization parameter.

71. The system as recited in claim 66, wherein said logic is further configured to cause said at least one transceiver to selectively transmit said forward path data signal at one angle with respect to said at least one first device transmit antenna.

72. The system as recited in claim 66, wherein said logic is further configured to cause said at least one transceiver to select said at least one first device transmit antenna from a plurality of first device transmit antennas that are each operatively coupled to said first device.

73. The system as recited in claim 72, wherein said logic is further configured to cause said at least one transceiver to selectively transmit a plurality of beams using two or more first device transmit antennas.

74. The system as recited in claim 73, wherein each of said transmitted plurality of beams is selectively adjusted in phase and amplitude to reduce multipath affects when received by said second device.

75. The system as recited in claim 58, wherein said at least one second device antenna includes at least one second device transmit antenna and at least one second device receive antenna.

76. The system as recited in claim 75, wherein said second device includes a plurality of second device receive antennas that are configured to receive said transmitted forward path data signal over said at least one forward transmission path from said first device.

77. The system as recited in claim 42, wherein said logic is further configured to iteratively selectively test different forward path pre-equalization parameters over time such that aliased multipath delays within said reverse path data signal are identifiable.

78. The system as recited in claim 42, wherein said logic is configured to provide sub-band equalizing of said forward path data signal using corresponding frequency domain reverse path data.

79. An apparatus comprising:
an Orthogonal Frequency Division Multiplexing (OFDM) processor configured to receive coded data and output corresponding OFDM data;
a pre-equalizer operatively coupled to said OFDM processor and configured to receive said OFDM data and output pre-equalized OFDM data based on gathered reverse link data;
at least one antenna;
an antenna signal processing component operatively coupled to said pre-equalizer and said at least one antenna, said antenna signal processing component being configured to receive said pre-equalized OFDM data from said pre-equalizer and apply a corresponding transmittable forward link data signal to said at least one antenna, the antenna signal processing component being further configured to receive a transmitted reverse link data signal using said at least one antenna and output corresponding reverse link data; and reverse link logic operatively coupled to said at least one antenna, said reverse link logic being configured to detect at least one multipath induced delay in said reverse link data and provide said gathered reverse link data to said pre-equalizer based on said multipath induced delay, wherein said reverse link logic is further configured to cause selectively establishing different transmission power levels for at least two Orthogonal Frequency Division Multiplexing (OFDM) tones in said transmittable forward link data signal.

80. The apparatus as recited in claim 79, wherein said pre-equalized OFDM data includes sub-carrier pre-equalized OFDM data.

81. The apparatus as recited in claim 79, wherein said reverse link logic detects said at least one multipath induced delay by identifying at least one transmission delay spread that is greater than a guard interval.

82. The apparatus as recited in claim 79, wherein said reverse link data signal includes identifiable training data.

83. The apparatus as recited in claim 82, wherein said reverse link logic is further configured to compare said identifiable training data to a non-delayed version of said training data to detect said at least one transmission delay.

84. The apparatus as recited in claim 79, wherein said pre-equalizer is configured to selectively invert and apply a measured channel response to said OFDM data.

85. The apparatus as recited in claim 79, wherein a reverse transmission path carrying said transmitted reverse link data signal towards said antenna is at least substantially reciprocal to a forward transmission path carrying said transmittable forward link data signal away from said at least one antenna.

86. The apparatus as recited in claim 79, wherein said apparatus includes a base station device suitable for use in a wireless communication system.

87. The apparatus as recited in claim 79, wherein said at least one antenna is operatively configured to provide transmission diversity.

88. The apparatus as recited in claim 79, wherein said at least one antenna is operatively configured to provide a spatial division technique to transmit the data signal as a narrow signal to reduce multipath propagation.

89. The apparatus as recited in claim 79, wherein said at least one antenna includes at least one transmit antenna and at least one receive antenna.

90. The apparatus as recited in claim 89, wherein said at least one transmit antenna includes at least one type of antenna selected from a group of suitable types of antennas comprising at least one omnidirectional type of antenna, at least one beam type of antenna, at least one phased array type of antenna, and at least one adaptive antenna.

91. The apparatus as recited in claim 89, wherein said at least one receive antenna includes at least one type of antenna selected from a group of suitable types of antennas comprising at least one omnidirectional type of antenna, at least one beam type of antenna, at least one phased array type of antenna, and at least one adaptive antenna.

* * * * *